April 27, 1965 P. E. LAPAT 3,180,702
PROCESS FOR PREPARING URANIUM NITRIDE
Filed Dec. 4, 1962
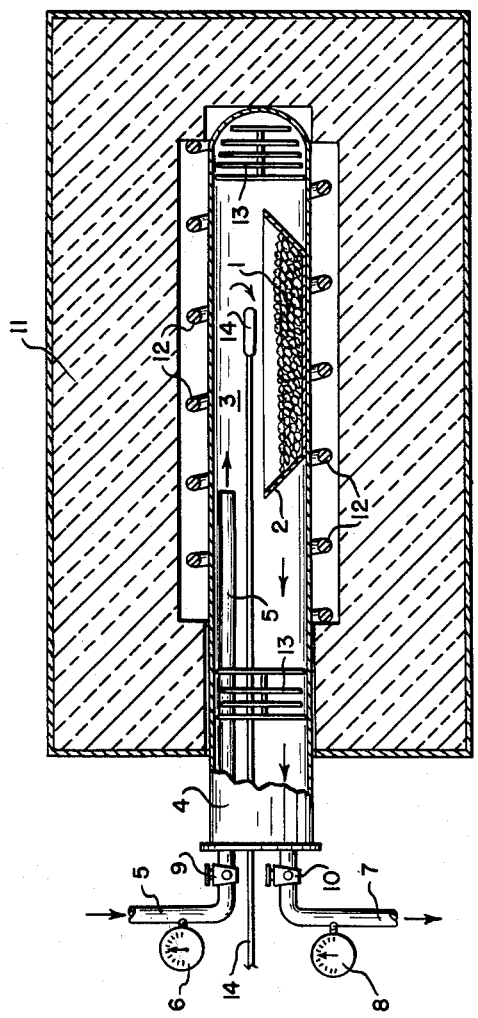
INVENTOR
Philip E. Lapat

United States Patent Office 3,180,702
Patented Apr. 27, 1965

3,180,702
PROCESS FOR PREPARING URANIUM NITRIDE
Philip E. Lapat, New Haven, Conn., assignor to United Nuclear Corporation, a corporation of New York
Filed Dec. 4, 1962, Ser. No. 242,191
8 Claims. (Cl. 23—14.5)

This invention relates to a process for preparing uranium nitride and more particularly to a process wherein the rate of reaction between finely divided uranium particles and nitrogen is controlled by reacting the uranium and nitrogen in the presence of hydrogen having a partial pressure between about 0.1 mm. Hg to 50 mm. Hg.

A process for making uranium nitride, UN, has been proposed and consists of the following steps: (1) conversion of massive uranium metal to finely divided uranium hydride, $UH_3$, by heating the uranium in a hydrogen atmosphere at about 250° C.; (2) removal of hydrogen by vacuum pumping at a higher temperature; (3) direct reaction of nitrogen with the finely divided uranium metal to form the higher nitrides $U_2N_3$ and $UN_2$; and (4) removal of excess nitrogen by heating in vacuum above 1000° C.

A variation of this process is one in which the removal of hydrogen and combination with nitrogen are done simultaneously by reacting the uranium hydride directly with nitrogen while sweeping out the hydrogen as it is formed.

It has been found, however, in attempting to carry out the original process, that the nitriding reaction, between the uranium and the nitrogen, is strongly exothermic and cannot be readily controlled. For example, when 1200 grams of finely divided uranium metal in a static vacuum system were exposed at 800° C. to nitrogen at a low pressure, the temperature rose within a few seconds to at least 2000° C. This caused sintering of the material and formation of a hard case, so that the reaction stopped. Subsequent exposure to nitrogen failed to cause completion of the reaction, and the chemical composition of the interior was found to be deficient in nitrogen. Furthermore, the hard case around the nitrogen mass was not amenable to crushing and grinding, and therefore the mass had to be discarded as waste.

The problem of controlling the nitriding reaction has been solved by the discovery that finely divided uranium particles, preferably prepared by the decomposition of uranium hydride, can be reacted with nitrogen at a controlled and convenient rate, at temperatures between about 450° C. to 1200° C., when the reaction is carried out in the presence of hydrogen, the partial pressure of the hydrogen being from about 0.1 to 50 mm. of Hg. The resulting product, usually having a molecular formula corresponding to about $UN_{1.75}$, may then be heated in vacuum above about 1000° C. to drive off nitrogen and produce a uranium nitride corresponding to the molecular formula UN.

Although it is preferable to prepare finely divided uranium particles by the decomposition of uranium hydride, any other suitable means of preparing the finely divided uranium particles, e.g., grinding, crushing, etc., can be employed so long as the particle size of the uranium is less than about 200 microns. Thus the term "finely divided uranium particles," as used herein, means uranium particles which have a particle size of less than about 200 microns.

Decomposition of uranium hydride can generally be carried out by heating the hydride at reduced pressures. For example, practically all the hydrogen is removed from the uranium when the temperature is brought up to about 700° C. to 900° C. The lower the pressure and the higher the temperature, the greater is the tendency for hydrogen to become free from the uranium. As the hydrogen is driven off, the uranium which remains is in an extremely finely divided state.

According to the present invention, the finely divided uranium particles are reacted with nitrogen in the presence of hydrogen at a temperature which is advantageously between about 450° C. and 1200° C., but preferably between 700° C. and 900° C., the partial pressure of the hydrogen being between about 0.1 mm. to 50 mm. of Hg, but preferably between about 0.5 to 3 mm. Hg.

If the finely divided uranium particles are prepared by the decomposition of $UH_3$, substantially all of the hydrogen which was associated with the uranium can be evacuated as the $UH_3$ is heated to high temperatures at low pressures. Some residual $UH_3$ may be present, however, particularly when the lower temperatures are employed. The nitrogen and addition hydrogen can then be admitted into the system which contains the finely divided uranium particles so that the partial pressure of hydrogen can be readily adjusted to about 0.1 to 50 mm. of Hg. The lower the partial pressure of the hydrogen, the more rapid is the reaction between the uranium and the nitrogen.

Instead of evacuating all the hydrogen which is given off by the decomposition of $UH_3$, only a portion of it can be evacuated, the remaining portion providing a partial pressure of hydrogen between about 0.1 mm. to 50 mm. Hg.

The partial pressure of the nitrogen has a slight effect upon the rate of reaction between the uranium and nitrogen, but not nearly the effect which the hydrogen partial pressure has. Therefore, the nitrogen partial pressure may be as low, or lower, than 10 mm. of Hg, or as high, or higher, than 10 atmospheres. A partial pressure of from about 150 mm. of Hg to 760 mm. of Hg is preferred. When the nitrogen pressure is low, the nitriding reaction tends to be slower than when the pressure is high.

In carrying out the process of this invention, it is to be understood that ammonia, as well as nitrogen, will readily react with the finely divided uranium particles, and that, therefore, the ammonia is considered to be the equivalent of nitrogen for the purpose of this invention and can be used along with, or in place of, the nitrogen. An additional factor to be taken into consideration, however, is that hydrogen is liberated as the ammonia reacts with the uranium, and this source of hydrogen is then taken into consideration in regulating the partial pressure of the hydrogen between 0.1 mm. and 50 mm. Hg, depending upon the rate of reaction desired.

The apparatus in which the invention can be carried out can be any of the well-known reaction furnaces, such as an induction furnace, or a resistance heater tube furnace such as is described in U.S. Patent No. 2,544,277. If the finely divided uranium is prepared by the decomposition of $UH_3$, such preparation, as well as the nitriding reaction between the uranium and the nitrogen, can be carried out in the same apparatus.

The drawing is a diagrammatic view in section of an apparatus which may be used in carrying out the invention. Uranium 1 is contained in a shallow receptacle 2 adapted to be inserted in reaction chamber 3. The reaction chamber is formed by reactor 4 which may be in the form of a cylinder having a gas inlet tube 5 with a pressure gauge 6 attached thereto and an exhaust tube 7 with a pressure gauge 8 attached thereto. Tubes 5 and 7 are provided with a means for opening and closing the tubes, such as stopcock 9 and stopcock 10. Reactor 4 is surrounded by heating means such as a conventional electric furnace 11 having heater wires 12. The reactor 4 is provided with heat shields 13 and a thermocouple 14. Inlet tube 5 is attached to a source of hydrogen and nitrogen or ammonia. Exhaust tube 7 leads to the inlet of a vacuum pump or any other suitable means for regulating pressure and disposing of waste products exhausted during the process. The apparatus is formed of a material which is resistant to the high temperatures and corrosion resulting from the process. Heat resistant ceramics or metal are suitable for this purpose.

The process, according to the present invention, may be carried out with the apparatus described above by preparing the finely divided uranium in situ and then reacting the uranium with nitrogen in the presence of hydrogen at a regulated pressure. In such preparation of uranium it is preferred that the uranium be converted to uranium hydride by passing hydrogen over uranium metal at a temperature of between 200° C. and 400° C. The uranium hydride is then decomposed by heating it, and the finely divided uranium may then be reacted with the nitrogen in the presence of hydrogen in the same apparatus.

In this embodiment of the invention, the uranium metal is cleaned with an acid, such as, for example, nitric acid, to remove surface impurities such as uranium oxides, or the like, washed free of acid and then dried prior to reaction with hydrogen. Where the uranium metal is not clean, the impurities remain in the reaction chamber and contaminate the final uranium nitride product. The clean uranium 1, in the form of lumps, turnings, or the like, is placed in receptacle 2, and the dish inserted in reaction chamber 3. After assembling the apparatus, the chamber is evacuated through exhaust tube 7 while stopcock 9 is closed. Hydrogen is then admitted into the chamber through tube 5 while stopcock 10 is closed. Alternatively, intake tube 5 can be attached to a source of inert gas such as argon or helium and, with stopcocks 9 and 10 open, the air in the chamber can be swept out by the inert gas, and this inert gas can then, in turn, be swept out by hydrogen. The inert gas is used first simply as a safety precaution, thereby avoiding the direct admission of hydrogen into an air-filled chamber.

After the air in the reaction chamber has been replaced by hydrogen, stopcocks 9 and 10 are closed and furnace 11 is placed into operation to heat the uranium metal to a temperature between about 125° C. and 400° C., the preferred temperature being about 250° C. As the reaction between the hydrogen and uranium proceeds, the hydrogen pressure tends to fall, but additional hydrogen is introduced into the chamber so as to maintain the hydrogen pressure at about atmospheric pressure. When the hydrogen pressure remains substantially constant, the reaction is considered to be complete. If desired, an excess of between 20 percent and 40 percent of hydrogen can be used, the excess passing out of the reaction chamber through exhaust tube 7.

As the reaction proceeds, the uranium hydride is formed as a powder on the uranium metal. If uranium is in the form of a metallic mass, the uranium hydride tends to slough off as it is formed, thereby exposing additional metal for the reaction. This continues until substantially all of the uranium is converted to uranium hydride.

After the uranium has been converted to uranium hydride, the temperature of the furnace is raised to between 450° C. to 1200° C., with stopcock 9 closed and stopcock 10 opened. After substantially all of the hydrogen has been evacuated through stopcock 10, stopcock 10 is closed. Hydrogen is admitted to the reaction chamber through stopcock 9, so that the partial pressure of the hydrogen is between about 0.1 to 50 mm. of hydrogen. Nitrogen is then admitted through stopcock 9 so that its partial pressure is preferably between about 150 mm. Hg to 760 mm. Hg. The temperature of furnace 11 is maintained at a temperature of between 450° C. to 1200° C. The rate of reaction between the nitrogen and the uranium can be regulated by either increasing or decreasing the partial pressure of the hydrogen.

In one specific example of the process, 1200 grams of finely divided uranium is prepared by hydriding uranium metal at approximately 250° C. and 380 mm. of Hg hydrogen pressure, then heating in vacuum to decompose the uranium hydride in order to form the uranium in a finely divided state. The heating is continued until the furnace temperature reaches about 750° C., the hydrogen being evacuated as it is liberated from the uranium. Additional hydrogen is then introduced until the partial pressure of the hydrogen is 1 mm. Hg. Nitrogen is then introduced until its partial pressure is about 240 mm. The temperature is at about 750° C. The reaction rate proceeds at about 0.026 gram mols per minute, the entire reaction taking about 2½ hours. Removal of excess nitrogen, so as to form UN, can be accomplished by heating in vacuum the resulting uranium nitride at temperatures above about 1000° C.

In carrying out the above process, the rate of reaction between the uranium and nitrogen can be slowed down by increasing the partial pressure of the hydrogen. For example, the rate of reaction is appreciably slowed down when the partial pressure of the hydrogen is raised to 20 mm. Hg.

Instead of evacuating all the hydrogen given off during the decomposition of $UH_3$ in the above process, only a portion of the hydrogen can be evacuated, the remaining portion providing a partial pressure of hydrogen between about 0.1 mm. of Hg to 50 mm. of Hg.

I claim:

1. The process of preparing uranium nitride which comprises reacting, at a temperature between about 450° C. and 1200° C., finely divided uranium particles with nitrogen in the presence of hydrogen, the partial pressure of the hydrogen being between about 0.1 mm. Hg to 50 mm. Hg.

2. The process of claim 1 in which the temperature is between about 700° C. and 900° C.

3. The process of claim 2 in which the partial pressure of the hydrogen is between about 0.5 mm. Hg and 3 mm. Hg.

4. The process of claim 3 in which the nitrogen is present at a partial pressure between about 150 mm. Hg and 760 mm. Hg.

5. The process of claim 1 in which the finely divided uranium is prepared by reacting uranium with hydrogen at a temperature between about 125° C. and 400° C. and then decomposing the resulting uranium hydride.

6. The process of claim 4 in which the finely divided uranium is prepared by reacting uranium with hydrogen at a temperature between about 125° C. and 400° C. and then decomposing the resulting uranium hydride.

7. The process of claim 6 in which the excess nitrogen in the resulting uranium nitride is removed by heating the uranium nitride in vacuum at a temperature above about 1000° C.

8. The process of preparing uranium nitride at a controlled rate which comprises reacting, at a given temperature between about 450° C. and 1200° C., finely divided uranium particles with nitrogen in the presence of hydrogen, the partial pressure of the hydrogen being at a given pressure between about 0.1 mm. Hg to 50 mm.

Hg, determining the rate of reaction between the finely divided uranium particles and the nitrogen under said given conditions, and modifying this rate of reaction by varying the partial pressure of the hydrogen.

References Cited by the Examiner
UNITED STATES PATENTS 2,544,277   3/51   Newton et al. _____ 23—14.5

OTHER REFERENCES

Katz et al.: "The Chemistry of Uranium," Part I, McGraw-Hill Book Company, Inc., 1951, pages 201–202, 232–234.

Katz et al.: "The Chemistry of the Actinide Elements," John Wiley & Sons, Inc., 1957, pages 151–152.

BMI-1313, "Further Studies of Sintered Refractory Uranium Compounds," Tupler et al., March 31, 1959, page 40.

ANL-6339, "High Purity Uranium Compounds," Eding et al., July 19, 1961, pages 22, 24–29.

CARL D. QUARFORTH, *Primary Examiner*.

REUBEN EPSTEIN, *Examiner*.